United States Patent
Chen et al.

(10) Patent No.: US 10,663,599 B2
(45) Date of Patent: May 26, 2020

(54) JOINT NON-COHERENT INTEGRAL VECTOR TRACKING METHOD BASED ON SPATIAL DOMAIN

(71) Applicant: Southeast University, Nanjing (CN)

(72) Inventors: Xiyuan Chen, Nanjing (CN); Yang Yang, Nanjing (CN); Xiying Wang, Nanjing (CN); Bingbo Cui, Nanjing (CN); Xinhua Tang, Nanjing (CN); Xuefen Zhu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 426 days.

(21) Appl. No.: 15/511,046

(22) PCT Filed: Jun. 27, 2016

(86) PCT No.: PCT/CN2016/087280
§ 371 (c)(1),
(2) Date: Mar. 14, 2017

(87) PCT Pub. No.: WO2017/067205
PCT Pub. Date: Apr. 27, 2017

(65) Prior Publication Data
US 2017/0276795 A1 Sep. 28, 2017

(30) Foreign Application Priority Data
Oct. 20, 2015 (CN) .......................... 2015 1 0686411

(51) Int. Cl.
*G01S 19/25* (2010.01)
*G01S 19/30* (2010.01)
(Continued)

(52) U.S. Cl.
CPC .......... *G01S 19/256* (2013.01); *G01S 5/0294* (2013.01); *G01S 19/235* (2013.01); *G01S 19/246* (2013.01); *G01S 19/30* (2013.01)

(58) Field of Classification Search
CPC .... G01S 19/256; G01S 19/235; G01S 19/246; G01S 5/0294
See application file for complete search history.

(56) References Cited

U.S. PATENT DOCUMENTS

| 5,983,160 A * | 11/1999 | Horslund ............. G01C 21/165 342/357.59 |
| 6,313,789 B1 | 11/2001 | Zhodzishsky et al. |
| 2003/0201934 A1 * | 10/2003 | Asher ..................... G01S 19/21 342/357.23 |

FOREIGN PATENT DOCUMENTS

| CN | 102890278 A | 1/2013 |
| CN | 104316941 A | 1/2015 |

(Continued)

OTHER PUBLICATIONS

Joint Vector Tracking Loop in a GNSS Receiver, Qiang Chen, Jan. 2011 (Year: 2011).*

(Continued)

*Primary Examiner* — Marc Anthony Armand
(74) *Attorney, Agent, or Firm* — Bayramoglu Law Offices LLC

(57) ABSTRACT

The present invention discloses a joint non-coherent integral vector tracking method based on a spatial domain, which is used for further improving the performance of a vector tracking GPS (Global Positioning System) receiver. In a new vector tracking strategy design, a phase discriminator/a frequency discriminator in a traditional vector tracking loop is discarded, and baseband signals of visible satellites in each channel are taken as an observation value after performing non-coherent integration, and EKF (abbreviation of (Continued)

Extended Kalman Filter) is used to estimate directly and to solve the position, the velocity, a clock error, etc. of the GPS receiver. Because of the existence of non-coherent integral calculation, when GPS satellite signals are relatively weak, a carrier to noise ratio of an observation value may be effectively improved, and the tracking sensitivity is improved.

3 Claims, 4 Drawing Sheets

(51) Int. Cl.
*G01S 5/02* (2010.01)
*G01S 19/23* (2010.01)
*G01S 19/24* (2010.01)

(56) References Cited

FOREIGN PATENT DOCUMENTS

| | | | |
|---|---|---|---|
| CN | 104765052 | A | 7/2015 |
| CN | 104931995 | A | 9/2015 |
| CN | 105388498 | A | 3/2016 |

OTHER PUBLICATIONS

Jing Liu, "Vector tracking loops in GNSS receivers for dynamic weak signals", Journal of Systems Engineering and Electronics, vol. 24, No. 3, Jun. 30, 2013, ISSN: 1004-4132, pp. 356-359, see the whole document.

* cited by examiner

JOINT NON-COHERENT INTEGRAL VECTOR TRACKING METHOD BASED ON SPATIAL DOMAIN

CROSS REFERENCE TO RELATED APPLICATIONS

This application is the national phase entry of International Application No. PCT/CN2016/087280, filed on Jun. 27, 2016, which is based upon and claims priority to Chinese Patent Application No. 201510686411.5 filed on Oct. 20, 2015, the entire contents of which are incorporated herein by reference.

TECHNICAL FIELD

The present invention relates to the technical field of navigation positioning with a medium and low precision requirement, such as city traffic and voyage, and develops, in order to meet navigation positioning requirements such as high precision, high reliability and a large positioning coverage range, a new satellite signal tracking technology on the basis of a traditional GPS software receiver technology, thereby realizing seamless positioning in weak satellite signals and high dynamic environments, etc.

BACKGROUND

In a high dynamic environment (aerospace field, launch vehicles, satellites and missiles), a GPS receiver is in a high-speed movement state and may have a very large acceleration or a jerk, and general commercial GPS receivers cannot work normally. In the high dynamic environment, a higher movement speed of a receiver enables a larger Doppler frequency shift to exist on a carrier, and furthermore when the receiver changes the movement state in a very high acceleration or a jerk, a violent change in the Doppler frequency shift of the carrier will be caused. The Doppler frequency shift with a violent change caused by high dynamism may bring about some problems to a tracking loop of the GPS receiver:

(1) it is required to complete an acquisition process as soon as possible and enter into a tracking process, and too large Doppler frequency shift may bring about a great difficulty to initial tracking, and in this situation, the tracking loop may only use a frequency-locked loop or a phase-locked loop with a wider bandwidth;

(2) since the Doppler frequency shift changes violently, an integration time must be very short, otherwise, a tracking bandwidth of the phase-locked loop or the frequency-locked loop may be easily exceeded, thus causing losing lock of signals;

and (3) when the signals are tracked in the high dynamic environment, since the Doppler frequency shift of the carrier changes violently, a shorter integration time and a larger filter noise bandwidth are used, and therefore, a loop signal to noise ratio is generally lower, and the tracking precision is poorer.

It is well-known that in GPS receivers, compared with traditional scalar tracking loops (STL), vector tracking loops (VTL) have many advantages, and particularly in weal signals and high dynamic environments, VTLs have better tracking sensitivity and re-acquiring velocity. The traditional GPS receivers may work well when the signal to noise ratio of a GPS signal is higher and dynamism of the carrier is lower. However, when being in a high dynamic movement state or the signal to noise ratio of the GPS signal is lower, the traditional GPS receiver will lose locking of the GPS signal. On the contrary, a GPS receiver based on a vector tracking loop has a much higher tolerance capability on a low signal to noise ratio and high dynamic environment than that of the traditional GPS receiver, and the vector tracking GPS receiver has a better performance than that of the traditional receiver.

However, a traditional vector tracking technology does not take full use of internal relations of the signals in each channel, and cannot be called vector tracking in a real sense. In fact, apart from pseudo ranges and pseudo range rates of the signals in each channel having internal coupling, phase discriminator outputs (pseudo ranges and pseudo range rate residuals) of all channels are also not independent from each other. When processing weak signals, we can also utilize this internal relation so as to improve the performance or the GPS receiver.

The present invention provides a new vector tracking strategy on the basis of a vector tracking idea to further improve the performance of the vector tracking GPS receiver. In a new vector tracking strategy design, a phase discriminator/a frequency discriminator in a traditional vector tracking loop is discarded, and baseband signals of visible satellites in each channel are taken as an observation value after performing non-coherent integration, and EKF is used to estimate the observation value so as to directly solve the position, the velocity, a clock error, etc. of the GPS receiver. Because of the existence of non-coherent integral calculation, when GPS satellite signals are relatively weak, a carrier to noise ratio of an observation quantity may be effectively improved, and the tracking sensitivity is improved.

SUMMARY OF THE INVENTION

The technical problems to be solved by the present invention are: overcoming the defects in the prior art, and providing a new signal tracking method in a GPS software receiver. The method overcomes the deficiency of positioning precision of a traditional software receiver because signals are shielded or a carrier is under a high dynamic environment, and may obtain a large number of pre-estimation processing gains, effectively improve the carrier to noise ratio of the observation quantity, improve the tracking sensitivity, and provide a more precise positioning service with a larger coverage range and higher reliability in weal signals and high dynamic environments. In order to achieve the above-mentioned objectives, the present invention adopts the following technical solutions:

in the present invention, a joint non-coherent integral vector tracking method based on a spatial domain, comprising the following steps:

(1) receiving satellite signals through a GPS antenna, superposing baseband signals in each channel, and realizing non-coherent integration of the signals among different channels, so as to improve the tracking sensitivity in a low signal to noise ratio condition;

(2) using a result after the non-coherent integration as an observation value, and using an Extended Kalman Filter to perform optimal estimation on navigation state parameters (the position, the velocity, and the acceleration);

and (3) predicting a code phase difference and a carrier frequency difference of each tracking channel according to an estimation result, so as to directly form a closed-loop tracking loop.

The joint non-coherent integral vector tracking method based on the spatial domain in the present invention, characterized in that a tracking period (an integration time) of the joint non-coherent integration vector tracking loop based on the spatial domain is one second, such that a large number of pre-estimation processing gains and enough estimation and calculation times may be obtained. Each estimation uses enough signal data, and good performance can be obtained in the case of weak signals.

Compared with the prior art, the present invention has the following advantages:

(1) a GPS receiver based on a vector tracking loop has a much higher tolerance capability on a low signal to noise ratio and a high dynamic environment than that of the traditional GPS receiver, and the vector tracking GPS receiver has a better performance than that of the traditional receiver.

(2) In a traditional GPS receiver, a tracking module contains several independent tracking loops with consistent functions, and each tracking loop performs independent tracking and processing on a single path of GPS satellite signals. Different from the traditional receiver, the vector tracking receiver in the present invention has only one tracking module called navigation filter, and the navigation filter is capable of performing tracking processing on the GPS satellite signals of all channels simultaneously, while also completing the task of calculating the position and velocity of the receiver. Since the vector GPS receiver uniformly processes the satellite signals of all channels, and dynamic tracking on the receiver is jointly completed by the signals of all channels, it has many advantages.

(3) When a traditional scalar tracking loop is used, each tracking channel must depend on itself to track the change in visual direction Doppler frequency and code phase change of one GPS satellite signal, and therefore, when the Doppler frequency changes violently or the received signal energy is too low, the tracking loop would lose locking. However, in a vector tracking process, since energies of all channels are gathered and the navigation filter may directly perform feedback on Doppler frequency change rate of each channel according to the movement state of the carrier, a lower tracking threshold and a higher bearing capacity for dynamic stress may be possessed.

The present invention provides a new vector tracking strategy on the basis of a vector tracking idea to further improve the performance of the vector tracking GPS receiver. In a new vector tracking strategy design, a phase discriminator/a frequency discriminator in a traditional vector tracking loop is discarded and baseband signals of visible satellites in each channel are taken as an observation quantity after performing non-coherent integration, and EKF is used to estimate the observation quantity so as to directly solve the position, the velocity, a clock error, etc. of the GPS receiver. Because of the existence of non-coherent integral calculation, when GPS satellite signals are relatively weak, a carrier to noise ratio of an observation quantity may be of improved, and the tracking sensitivity is improved.

DETAILED DESCRIPTION OF THE INVENTION

Figure 1:
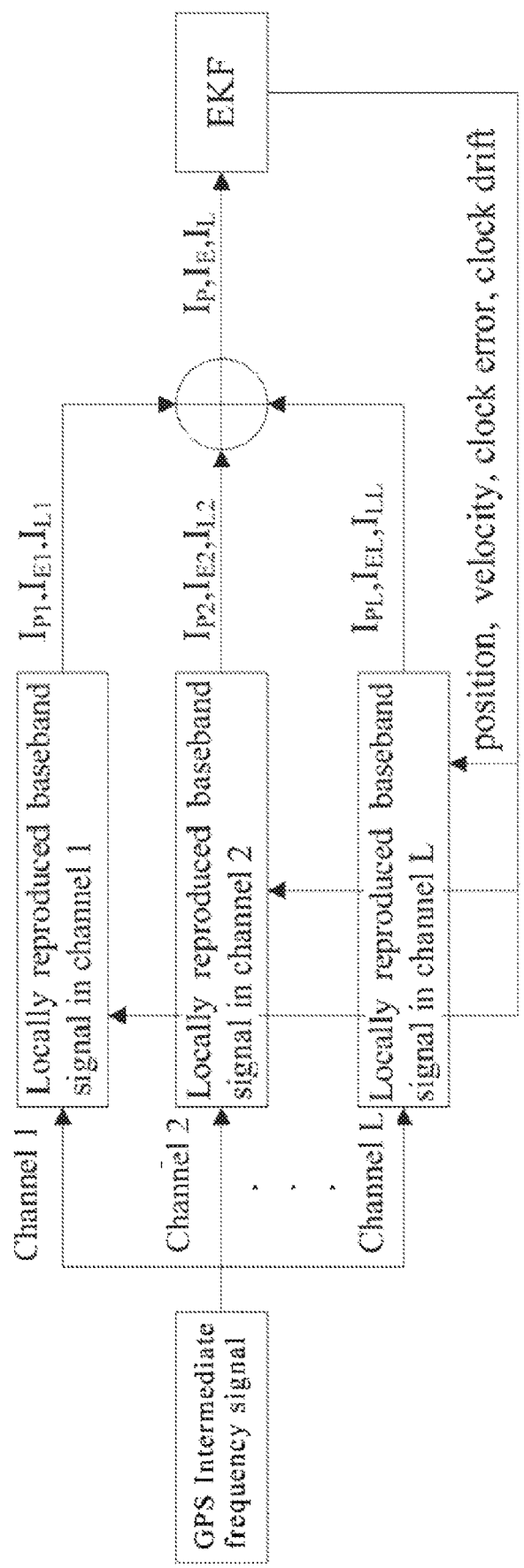
FIG. 1 is a structural diagram of a tracking loop of a GPS receiver of the present invention.
Figure 2:
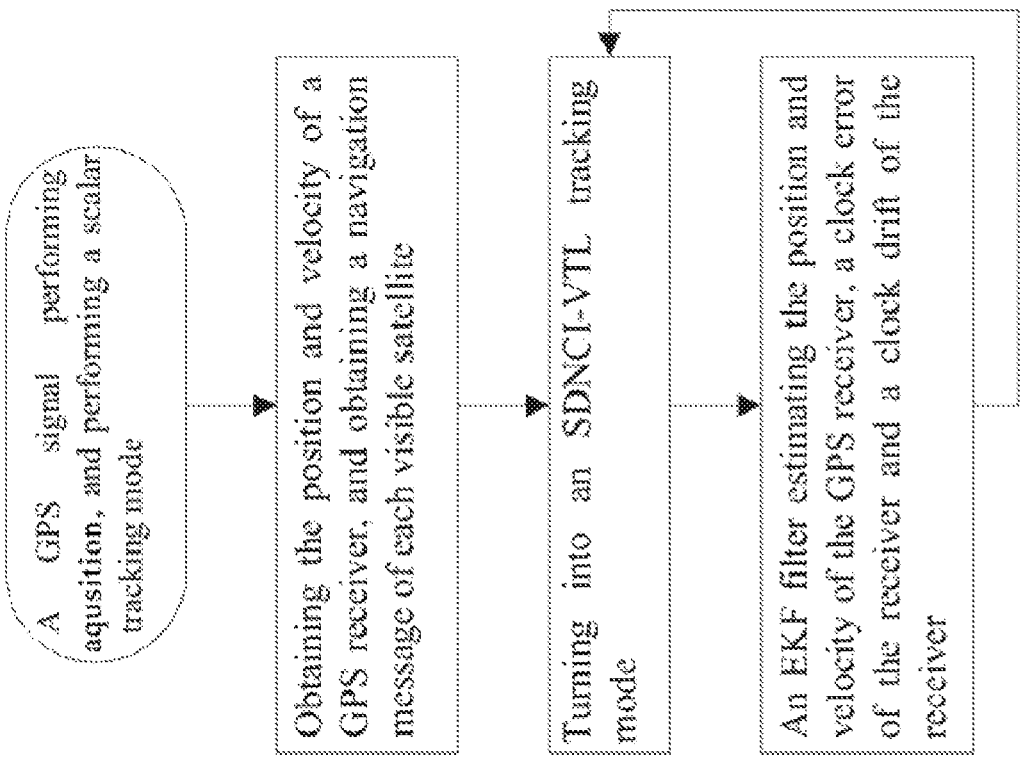
FIG. 2 is a working flow diagram of a GPS receiver of the present invention.
Figure 3:
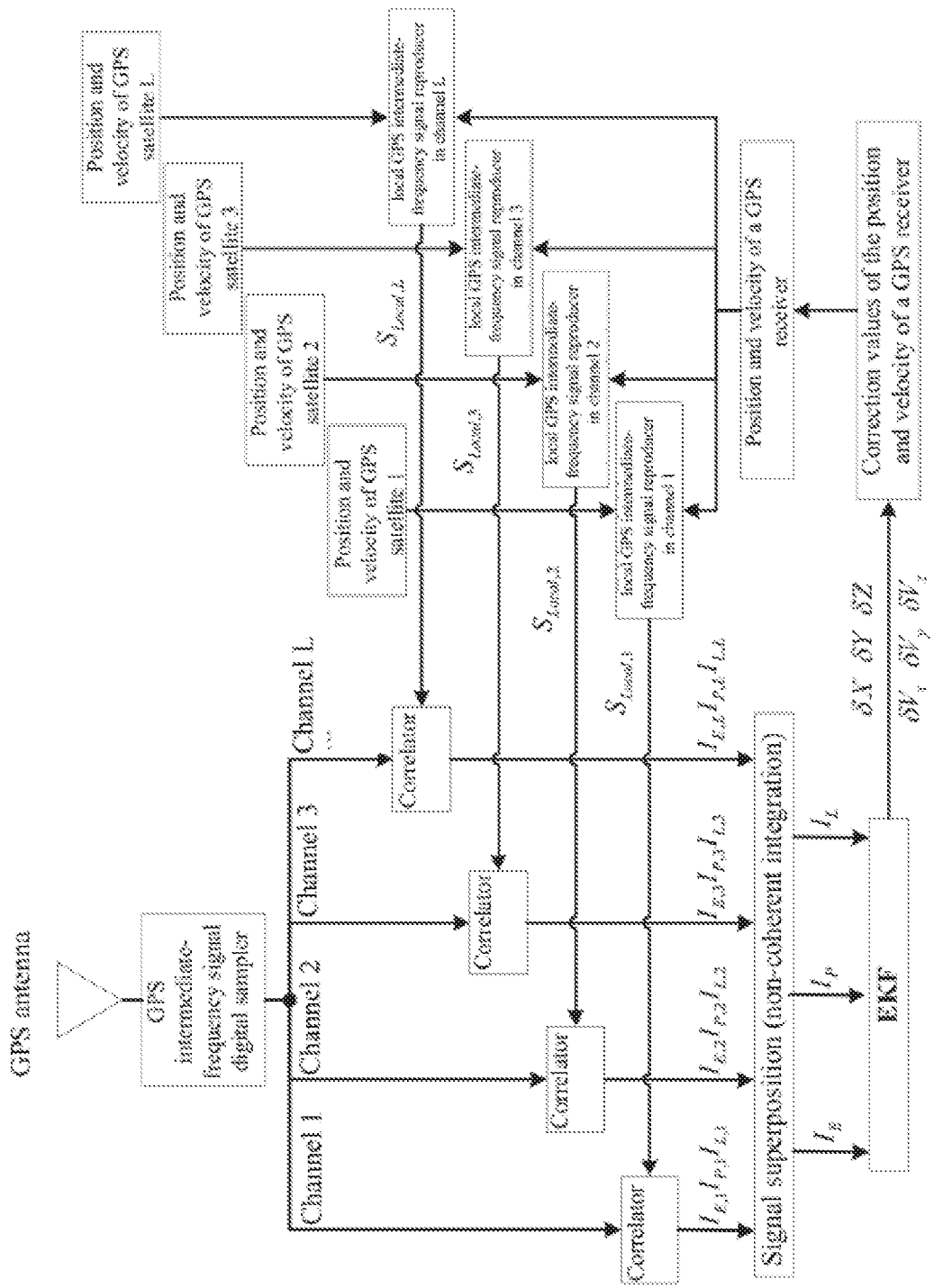
FIG. 3 is a structural principle of a GPS receiver of the present invention.
Figure 4:
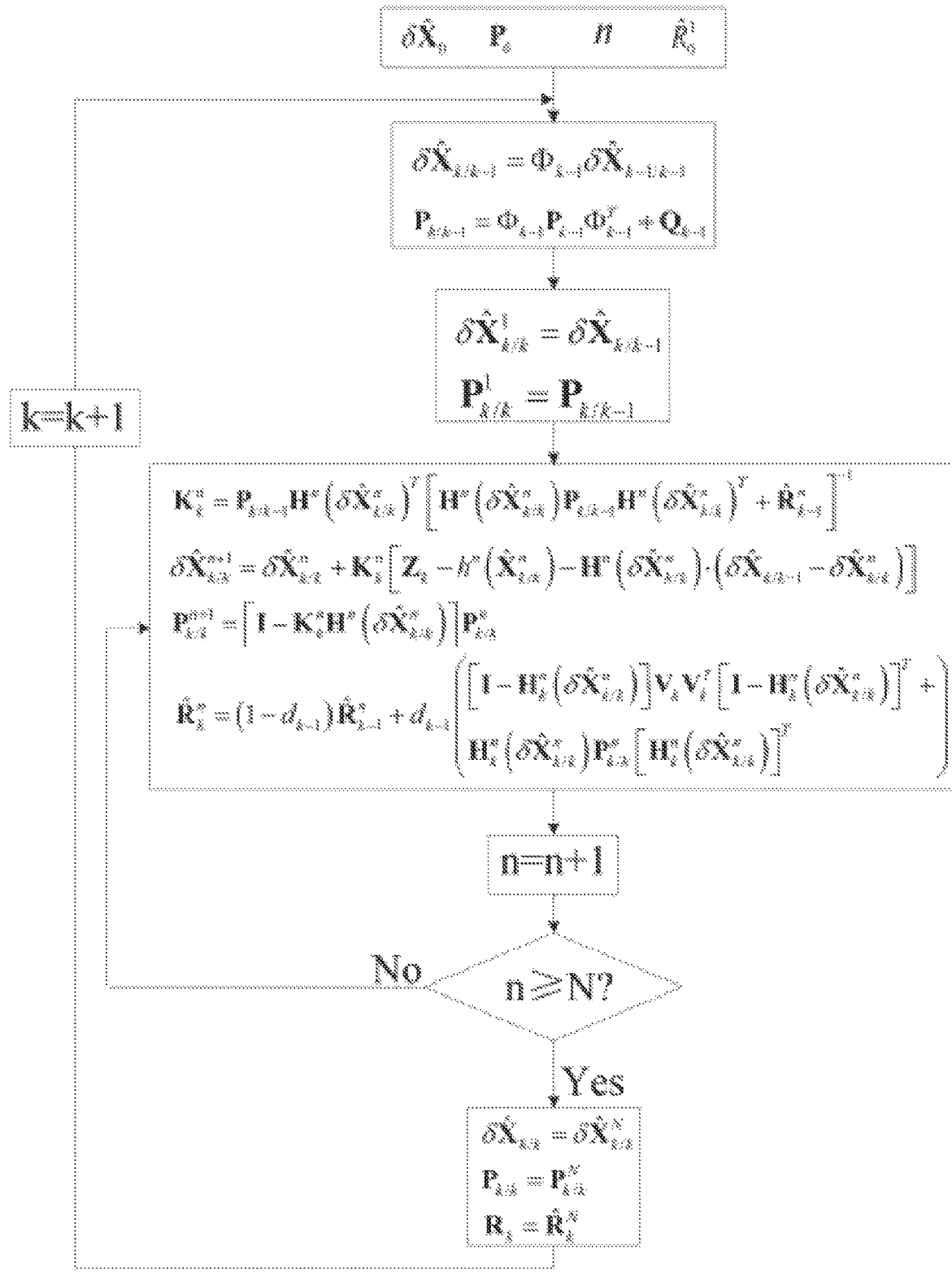
FIG. 4 is an algorithm flow diagram of a GPS receiver of the present invention.

In the working process of the GPS receiver, in order to obtain a pseudo range (distance) and a pseudo range rate (the visual direction velocity) of each tracking channel, it is required to use a received GPS intermediate-frequency signal and a local reproduced carrier and a reproduced pseudo random sequence of each tracking channel to perform coherent and integral calculations. We assume that the current moment is k moment, and the next moment is k+1 moment, in a tracking process, we need to utilize data at the k moment to estimate signal parameters of the k+1 moment.

Taking a tracking channel of the $l_{th}$ satellite as an example, assuming that a pseudo random code phase at the current moment is $\tau_{l,k}$ (unit: meter), a pseudo random code frequency is $f_{code,l,k}$ (unit: chip/second), a clock error of the GPS receiver is $t_{b,k}$ (unit: meter), a clock drift of the GPS receiver is $t_{d,k}$ (unit: meter/second), the position of the GPS receiver is $P_k$, the velocity of the GPS receiver is $V_k$, the position of the satellite is $P_{satellite,l,k}$ and the velocity of the satellite is $V_{satellite,l,k}$, wherein $$P_k = [X_k Y_k Z_k]^T \quad (1)$$

$$V_k = [V_{x,k} V_{y,k} V_{z,k}]^T \quad (2)$$

$$P_{satellite,l,k} = [X_{satellite,l,k} Y_{satellite,l,k} Z_{satellite,l,k}]^T \quad (3)$$

$$V_{satellite,l,k} = [V_{x,satellite,l,k} V_{y,satellite,l,k} V_{z,satellite,l,k}]^T \quad (4)$$

the relation between the position/velocity of the GPS receiver at the k moment and the position/velocity of the GPS receiver at the k+1 moment is $$P_{k+1} = P_k + V_k + V_k t_{k,k+1} + \delta P_{k+1} \quad (5)$$

$$V_{k+1} = V_k + \delta V_{k+1} \quad (6)$$

$$\hat{P}_{k+1} = P_k + V_k t_{k,k+1} \quad (7)$$

$$\hat{V}_{k+1} = V_k \quad (8)$$

wherein $\hat{P}_{k+1}$ is a prediction value of the position of the GPS receiver at the k+1 moment; $\hat{V}_{k+1}$ is a prediction value of the velocity of the GPS receiver at the k+1 moment; $\delta P_{k+1}$ is an error of the prediction value of the position of the GPS receiver at the k+1 moment; and $\delta V_{k+1}$ is an error of the prediction value of the velocity of the GPS receiver at the k+1 moment.

We know that the tracking process of the tracking loop of the GPS receiver is substantively a tracking process on the change in code phase and the carrier Doppler frequency of the received GPS satellite signals. The change in the relative position between the GPS receiver and the GPS satellite causes the change in the code phase, the change in the relative velocity between the GPS receiver and the OPS satellite causes the change in the Doppler frequency, and they satisfy the following relation there between $$\Delta \tau_l(k, k+1) = \quad (9)$$
$$[(P_{k+1} - P_k) - (P_{satellite,l,k+1} - P_{satellite,l,k})]^T a_{j,k+1} + \Delta t_{b,k+1}$$

-continued $$\Delta df_l(k, k+1) = \qquad (10)$$
$$f_{L1} \frac{[(V_{k+1} - V_k) - (V_{satellite,l,k+1} - V_{satellite,l,k})]^T a_{j,k+1} + \Delta t_{d,k+1}}{c}$$

wherein, $\Delta \tau_l(k, k+1)$ is a variation quantity of the code phase with meter being the unit from a k moment to a k+1 moment; $P_{satellite, l, k}$ is the position of the satellite l within a [k, k+1] period, which may be obtained by means of direct calculation of a navigation message; $\Delta t_{b, k+1}$ is a variation quantity of the clock error of the receiver within the [k, k+1] period, and the unit is meter; $\Delta df_l(k, k+1)$ is a variation quantity of the Doppler frequency with Hz being the unit within the [k, k+1] period; $f_{L1}$=1575.42 MHz is the carrier frequency of a GPS signal at an L1 waveband; $V_{satellite, l, k}$ is the velocity of the satellite l within the [k, k+1] period, which may be obtained by means of direct calculation of the navigation message; $\alpha_{j, k+1}$ is a unit vector of a visual direction projection from k to k+1 moment; and $\Delta t_{d, k+1}$ is a variation quantity of the clock error drift of the receiver within the [k, k+1] period, and the unit is m/s; c=2.99792458×10$^8$ meter/second, which is the light velocity in vacuum.

Assuming that a reproduced code and a carrier of a local tracking loop at the current moment (k moment) have been synchronized, namely, the code phase $\tau_l(k)$ and the carrier Doppler frequency $df_l(k)$ at the k moment are known, the code phase and the carrier Doppler frequency at the k+1 moment are:

$$\tau_l(k+1) = \tau_l(k) + \Delta \tau_l(k, k+1) + t_{k,k+1} f_{l,code,k} \qquad (11)$$

$$df_l(k+1) = df_l(k) + \Delta df_l(k, k+1) \qquad (12)$$

$$f_l(k+1) = f_{IF} + df_l(k+1) \qquad (13)$$

wherein $\tau_l(k+1)$ is a code phase of the satellite l at the k+1 moment; $df_l(k+1)$ is the carrier Doppler frequency of the satellite l at the k+1 moment; $f_l(k+1)$ is the carrier frequency of the satellite l at the k+1 moment;

$$f_{l,code,k} = \frac{1.023}{1575.42} f_l(k)$$

is a code frequency, and the unit is chip/s.

By substituting formula (5) and formula (6) into formula (9) and formula (10), it can be obtained:

$$\Delta \tau_l(k, k+1) = [V_k t_{k,k+1} + \delta P_{k+1} - \Delta P_{satellite,l,k}]^T a_{j,k+1} + \Delta t_{b,k+1} \qquad (14)$$

$$\Delta df_l(k, k+1) = f_{L1} \frac{[\delta V_{k+1} - V_{satellite,l,k}]^T a_{j,k+1} + \Delta t_{d,k+1}}{c} \qquad (15)$$

wherein
$\Delta P_{satellite,l,k} = (P_{satellite,l,k+1} - P_{satellite,l,k});$
$\Delta V_{satellite,l,k} = (V_{satellite,l,k+1} - V_{satellite,l,k}).$ By substituting formula (12), formula (14), and formula (15) into formula (11) and formula (13), it can be obtained:

$$\tau_l(k+1) = \tau_l(k) + \qquad (16)$$
$$[V_k t_{k,k+1} + \delta P_{k+1} - \Delta P_{satellite,l,k}]^T a_{j,k+1} + \Delta t_{b,k+1} + t_{k,k+1} f_{l,code,k}$$

-continued $$f_l(k+1) = f_{IF} + df_l(k) + f_{L1} \frac{[\delta V_{k+1} - \Delta V_{satellite,l,k}]^T a_{j,k+1} + \Delta t_{d,k+1}}{c} \qquad (17)$$

wherein $a_{j, k+1}$ is a view direction unit vector of the GPS receiver pointing to the $l_{th}$ satellite within the [k, k+1] period, since the GPS receiver is far away from the satellite, the change in the relative position between the GPS satellite and the GPS receiver can be neglected within the [k, k+1] period, namely, regarding $a_{j, k+1}$ as a fixed value, which may be obtained through direct calculation of the position of the receiver and the position of the GPS satellite at the k moment, and is a known quantity; $\Delta P_{satellite, l, k}$ and a $\Delta V_{satellite, l, k}$ are the variation quantities of the position and the velocity of the $l_{th}$ satellite within the [k, k+1] period, which may be obtained through direct calculation of navigation message data of the GPS satellite, and is a known quantity; $f_{IF}$ is a central frequency of an intermediate-frequency signal of the GPS receiver, and is a known quantity; and $df_l(k)$ is the Doppler frequency of the $l_{th}$ satellite at the k moment, and because carrier synchronization has been completed at the k moment, the carrier Doppler frequency at the k moment is known. In formula (16) and formula (17), unknown quantities which can affect the code phase and the Doppler frequency of the $l_{th}$ satellite at the k+1 moment are a position error $\delta P_{k+1}$, a velocity error $\delta V_{k+1}$, a clock error $t_{b, k+1}$, and a clock drift error $t_{d, k+1}$ of the GPS receiver at the k+1 moment. Therefore, it is very natural to choose $\delta P$, $\delta V$, $\Delta t_b$ and $\Delta t_d$ as state vectors of the tracking loop.

Assuming a complex model of an L1 waveband baseband signal of the $l_{th}$ satellite signal received by the GPS receiver at the k+1 moment as $$s_l(k+1) = a_l(k+1) C_l(k+1) D_l(k+1) \exp[j2\pi f_{code,l}(k+1) t_{k+1} + j\delta\varphi_{l,k+1}] + \eta_l \qquad (18)$$

wherein $a_l(k+1)$ is a signal amplitude at the k+1 moment; $C_l(k+1)$ is a pseudo random code at the k+1 moment; $D_l(k+1)$ is a navigation message data bit at the k+1 moment, with the value thereof being ±1; $\delta\varphi_{l,k+1}$ is a carrier phase difference at the k+1 moment; and $\eta_l$ is a zero-mean-value Gaussian white noise.

In a vector tracking process, we only care the code phase and the carrier frequency, and are not interested in the carrier phase difference and the signal amplitude, and therefore, formula (18) may be rewritten as the following form:

$$s_l(k+1) = \bar{a}_l(k+1) D_l(k+1) C_l(k+1) \exp[j2\pi f_{cord,l}(k+1) t_{k+1}] + \eta_l \qquad (19)$$

wherein $\bar{a}_l = a_l(k+1) \exp(j\delta\varphi_{l,k+1})$.

Further, from formula (16) and formula (17), we may obtain a "true value" of a local promptly reproduced intermediate-frequency signal of the $l_{th}$ satellite:

$$s_{local,l}(k+1) = \bar{a}_l(k+1) D_l(k+1) C_l[\tau_l(k+1)] \exp[j2\pi f_l(k+1) t_{k+1}] \qquad (20)$$

wherein $D_l(k+1)$ is a navigation message data bit, and since a navigation message is updated once every two hours, we may regard same as a known quantity herein. The "true value" of the local reproduced intermediate-frequency signal and the received GPS intermediate frequency signal are used to perform coherent integration, and the coherent integration result within the [k, k+1] period is:

$$\sum_{t=t_u}^{t_{k+1}} s_l(t) \cdot S_{Local,l}(t) = \sum_{t=t_k}^{t_{k+1}} \bar{a}_l(t) \bar{a}_l(t) \cdot D_l(k+1) \cdot D_l(k+1) \qquad (21)$$

-continued $$D_l(k+1)C_l(t)C_l[\tau_l(t)] \cdot \exp[j2\pi f_l(t)t]\exp[j2\pi f_{carr,l}(t)t_{k+1}]$$

Further, since the local promptly reproduced intermediate-frequency signal of the $l_{th}$ satellite generated by us is a "true value", namely, a locally reproduced code being "accurately" aligned with the reproduced code in the received GPS signal, the locally reproduced carrier frequency is also "accurate". In addition, the amplitude change of the GPS signal is very small within the [k, k+1] time period and can be regarded as a constant value, and therefore, the following relation exists in formula (21):

$$C_l(t)C_l[\tau_l(t)] \approx 1 \quad (22)$$

$$\exp[j2\pi f_l(t)t]\exp[j2\pi f_{cord,l}(t)t_{k+1}] \approx 1 \quad (23)$$

Therefore, formula (21) can be simplified as the following form:

$$I_{P,l,k,k+1} = \sum_{t=t_k}^{t_{k+1}} s_l(t) \cdot s_{Local,l}(t) = \sum_{t=t_k}^{t_{k+1}} \bar{a}_l(t)\bar{\hat{a}}_l(t) + \eta_{k,k+1} = N \cdot \bar{A}_{k+1} + \eta_{l,k,k+1} \quad (24)$$

wherein $I_{P, l, k, k+1}$ is a coherent integration result of the $l_{th}$ satellite prompt signal in the [k, k+1] period; $\bar{A}_{k+1} = \bar{a}_l(k+1)$ $\bar{a}_l(k+1)$; N is the number of integration points within the [k, k+1] period; and $\eta_{l, k, k+1}$ is a zero-mean-value Gaussian white noise.

By the same reasoning, we can obtain coherent integration results of a early signal and a late signal early/late 0.5 chip):

$$I_{E,l,k,k+1} = 0.5 \cdot N \cdot \bar{A}_{k+1} + \eta_{l,k,k+1} \quad (25)$$

$$I_{L,l,k,k+1} = 0.5 \cdot N \cdot \bar{A}_{k+1} + \eta_{l,k,k+1} \quad (26)$$

in an environment where signals fade seriously, the most effective method for improving the signal to noise ratio is to perform coherent integration and non-coherent integration. The traditional non-coherent integration is realized by accumulating coherent integration results of a certain path of satellite signals within a continuous time interval. Although this method is easy in implementation, since the Doppler frequency changes over time, with the increase in non-coherent integration time, the change in the Doppler frequency will have serious impacts on the integration result. As for this problem, the present invention proposes a new non-coherent integration method, namely, performing joint non-coherent integration on coherent integration results of different satellite tracking channels, such that the signal to noise ratio can be significantly improved without increasing an integration time.

From formula (24), formula (25) and formula (the joint non-coherent integration of the prompt signals of different satellite tracking channels may be obtained, which is:

$$I_{P,k,k+1} = \sum_{l=1}^{L} I_{P,l,k,k+1} = L \cdot N \cdot A_{k+1} + \eta_{k+1} \quad (27)$$

$$I_{E,k,k+1} = \sum_{l=1}^{L} I_{E,l,k,k+1} = 0.5 \cdot L \cdot N \cdot A_{k+1} + \eta_{k+1} \quad (28)$$

$$I_{L,k,k+1} = \sum_{l=1}^{L} I_{P,l,k,k+1} = 0.5 \cdot L \cdot N \cdot A_{k+1} + \eta_{k+1} \quad (29)$$

$$A_{k+1} = \frac{1}{L}\sum_{i=1}^{L} \bar{A}_{k+1} \quad (30)$$

wherein L is the number of visible GPS satellites.

In formula (27), formula (28), formula (29) and formula (30), $I_{P, k, k+1}$, $I_{E, k, k+1}$ and $I_{L, k, k+1}$ are coherent integration results of GPS baseband signals and local reproduction signals, which are selected by us as observation quantities of the tracking loop; and $A_{k+1}$ is an average value of the signal amplitudes of all channels, which is an unknown quantity, and may be taken as a state vector of the tracking loop.

In summary, the state vectors of the whole discrete system are $\delta P$, $\delta V$, $t_b$, $t_d$ and A, and by combining formula (1), formula (2), formula (5) and formula (6), we establish a system equation of the Kalman Filter in the vector tracking loop system, which is:

$$\begin{bmatrix} \delta X \\ \delta Y \\ \delta Z \\ \delta V_x \\ \delta V_y \\ \delta V_z \\ \Delta t_b \\ \Delta t_d \\ A \end{bmatrix}_{k+1} = \begin{bmatrix} 1 & 0 & 0 & t_{k,k+1} & 0 & 0 & 0 & 0 & 0 \\ 0 & 1 & 0 & 0 & t_{k,k+1} & 0 & 0 & 0 & 0 \\ 0 & 0 & 1 & 0 & 0 & t_{k,k+1} & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & t_{k,k+1} & 0 \\ 0 & 0 & 0 & 0 & 0 & 0 & 0 & 1 & 0 \\ 0 & 0 & 0 & 0 & 0 & 0 & 0 & 0 & 1 \end{bmatrix} \begin{bmatrix} \delta X \\ \delta Y \\ \delta Z \\ \delta V_x \\ \delta V_y \\ \delta V_z \\ \Delta t_b \\ \Delta t_d \\ A \end{bmatrix}_k + Q_k \quad (31)$$

wherein $t_{k, k+1}$ is an integration time within a [k, k+1] period, and in specific implementation, we select one second.

The observation quantities of the systems are $I_P$, $I_E$ and $I_L$, which can be obtained by r leans of calculation through formula (20), formula (24), formula (25), and formula 6), and by combining formula (27), formula (28), formula (29), and formula (30), we establish an observation equation of the Kalman Filter in the vector tracking loop system, which is:

$$\begin{bmatrix} I_P \\ I_E \\ I_L \end{bmatrix}_{k+1} = \begin{bmatrix} 0 & 0 & 0 & 0 & 0 & 0 & 0 & L \cdot N \\ 0 & 0 & 0 & 0 & 0 & 0 & 0 & 0.5 \cdot L \cdot N \\ 0 & 0 & 0 & 0 & 0 & 0 & 0 & 0.5 \cdot L \cdot N \end{bmatrix} \begin{bmatrix} \delta X \\ \delta Y \\ \delta Z \\ \delta V_x \\ \delta V_y \\ \delta V_z \\ \Delta t_b \\ \Delta t_d \\ A \end{bmatrix}_{k+1} + R_{k+1} \quad (32)$$

What is claimed is:

1. A joint non-coherent integral vector tracking method based on a spatial domain, comprising following steps:
   (1) receiving satellite signals through a GPS antenna, having tracking channels of satellites, superposing baseband signals in each of the tracking channels, and performing joint non-coherent integration on coherent integration of the signals among different channels so as to improve a tracking sensitivity in a low signal to noise ratio condition without increasing a tracking period, wherein the joint non-coherent integration is $$I_{P,k,k+1} = \sum_{l=1}^{L} I_{P,l,k,k+1} = L \cdot N \cdot A_{k+1} + \eta_{k+1}$$

$$I_{E,k,k+1} = \sum_{l=1}^{L} I_{E,l,k,k+1} = 0.5 \cdot L \cdot N \cdot A_{k+1} + \eta_{k+1}$$

$$I_{L,k,k+1} = \sum_{l=1}^{L} I_{L,l,k,k+1} = 0.5 \cdot L \cdot N \cdot A_{k+1} + \eta_{k+1};$$

wherein $$A_{k+1} = \frac{1}{L} \sum_{i=1}^{L} \overline{A}_{k+1};$$

L is number of visible GPS satellites, N is number of integral points within a [k, k+1] period; $\eta_{k+1}$ is a zero-mean-value Gaussian white noise; $I_{P, l, k, k+1}$ is a coherent integration result of an $l_{th}$ satellite prompt signal in the [k, k+1] period; $I_{P, k, k+1}, I_{E, k, k+1}$ and $I_{L, k, k+1}$ are coherent integration results of GPS baseband signals and local reproduction signals, and $\overline{A}_{k+1} = \overline{a}_l(k+1)\overline{a}_l(k+1)$, $a_l(k+1)$ is a signal amplitude at a k+1 moment, and $A_{k+1}$ is an average value of signal amplitudes of all the channels;

(2) using a result after the joint non-coherent integration as an observation value, and using an Extended Kalman Filter to perform an estimation on navigation state parameters; and
   (3) predicting a code phase difference and a carrier frequency difference of each-tracking channel according to a result of the estimation, so as to directly form a closed-loop tracking loop; wherein a reproduced code and a carrier of a local tracking loop at the current moment (k moment) have been synchronized, namely, a code phase $\tau_l(k)$ and a carrier Doppler frequency $df_l(k)$ at the k moment are known, the code phase and the carrier Doppler frequency at the k+1 moment are:

$$\tau_l(k+1) = \tau_l(k) + \Delta\tau_l(k,k+1) + t_{k,k+1} f_{l,code,k}$$

$$df_l(k+1) = df_l(k) + \Delta df_l(k,k+1)$$

$$f_l(k+1) = f_{IF} + df_l(k+1)$$

wherein $\tau_l$ (k+1) is the code phase of the satellite l at the k+1 moment; $df_l$ (k+1) is the carrier Doppler frequency of the satellite l at the k+1 moment; $f_l$ (k+1) is the carrier frequency of the satellite l at the k+1 moment;

$$f_{l,code,k} = \frac{1.023}{1575.42} f_l(k)$$

is a code frequency, and the unit is chip/s.

2. The tracking method according to claim 1, wherein the tracking period of a joint non-coherent integral vector tracking loop based on the spatial domain is one second.

3. The tracking method according to claim 1, wherein a system equation of the Extended Kalman Filter in a vector tracking loop system in the step (2) is $$\begin{bmatrix} I_P \\ I_E \\ I_L \end{bmatrix}_{k+1} = \begin{bmatrix} 0 & 0 & 0 & 0 & 0 & 0 & 0 & L \cdot N \\ 0 & 0 & 0 & 0 & 0 & 0 & 0 & 0.5 \cdot L \cdot N \\ 0 & 0 & 0 & 0 & 0 & 0 & 0 & 0.5 \cdot L \cdot N \end{bmatrix} \begin{bmatrix} \delta X \\ \delta Y \\ \delta Z \\ \delta V_x \\ \delta V_y \\ \delta V_z \\ \Delta t_b \\ \Delta t_d \\ A \end{bmatrix}_{k+1} + R_{k+1}.$$

* * * * *